US008277520B2

(12) United States Patent
Inoue et al.

(10) Patent No.: US 8,277,520 B2
(45) Date of Patent: Oct. 2, 2012

(54) METHOD FOR PRODUCING NEGATIVE ELECTRODE FOR NON-AQUEOUS ELECTROLYTE SECONDARY BATTERY, AND NEGATIVE ELECTRODE FOR NON-AQUEOUS ELECTROLYTE SECONDARY BATTERY (75) Inventors: Toshihiro Inoue, Osaka (JP); Masao Fukunaga, Osaka (JP); Takafumi Oura, Osaka (JP)

(73) Assignee: Panasonic Corporation, Osaka (JP)

( * ) Notice: Subject to any disclaimer, the term of this patent is extended or adjusted under 35 U.S.C. 154(b) by 869 days.

(21) Appl. No.: 11/945,442

(22) Filed: Nov. 27, 2007

(65) Prior Publication Data
US 2008/0124628 A1    May 29, 2008

(30) Foreign Application Priority Data

Nov. 28, 2006    (JP) ................................ 2006-319854

(51) Int. Cl.
*H01M 4/04* (2006.01)
*H01M 4/13* (2010.01)
*H01M 10/05* (2010.01)
*H01M 10/12* (2006.01)

(52) U.S. Cl. ........................ 29/623.1; 429/209; 429/217
(58) Field of Classification Search .................... 205/57; 429/209–246; 29/623.1–623.5
See application file for complete search history.

(56) References Cited

U.S. PATENT DOCUMENTS

| 2002/0160101 A1* | 10/2002 | Ikeda et al. ...................... 427/58 |
| 2003/0087152 A1* | 5/2003 | Shindo et al. .................. 429/217 |
| 2005/0244711 A1* | 11/2005 | Fukui et al. .................... 429/217 |
| 2005/0266305 A1* | 12/2005 | Ohata et al. .................... 429/144 |

FOREIGN PATENT DOCUMENTS

| JP | 2000-67871 A | 3/2000 |
| JP | 3101775 | 8/2000 |
| JP | 2004-247184 A | 9/2004 |
| WO | WO 2005/067081 * | 7/2005 |

* cited by examiner

*Primary Examiner* — Basia Ridley
*Assistant Examiner* — Jacob Buchanan
(74) *Attorney, Agent, or Firm* — McDermott Will & Emery LLP (57) ABSTRACT One aspect of the present invention pertains to a method for producing a negative electrode for a non-aqueous electrolyte secondary battery, which comprises a paste preparing step of kneading a mixture containing a negative electrode active material, a binder resin having a glass transition temperature within a range from 20 to 40° C. and a dispersion solvent to prepare a negative electrode material mixture paste, a paste applying step of applying the negative electrode material mixture paste controlled to a temperature which is at least 10° C. higher than the glass transition temperature of the binder resin on a current collector to form a coating film, a coating film drying step of drying the coating film to form a negative electrode precursor, and a rolling step of rolling the negative electrode precursor to prepare a negative electrode having a negative electrode material mixture layer.

3 Claims, 1 Drawing Sheet

METHOD FOR PRODUCING NEGATIVE ELECTRODE FOR NON-AQUEOUS ELECTROLYTE SECONDARY BATTERY, AND NEGATIVE ELECTRODE FOR NON-AQUEOUS ELECTROLYTE SECONDARY BATTERY

BACKGROUND OF THE INVENTION

1. Field of the Invention

The present invention relates to a method for producing a negative electrode for a non-aqueous electrolyte secondary battery, and a negative electrode for a non-aqueous electrolyte secondary battery obtained by the method, and particularly to formation of a negative electrode material mixture layer which is less likely to separate or fall from a negative electrode current collector.

2. Description of the Related Art

A non-aqueous electrolyte secondary battery includes, as basic constituent elements, a positive electrode plate, a negative electrode plate, a separator which insulates the positive electrode plate and the negative electrode plate, and a non-aqueous electrolytic solution which enables migration of ions between the positive electrode plate and the negative electrode plate. The positive electrode plate is composed of a positive electrode current collector and a positive electrode material mixture layer formed on the surface of the positive electrode current collector, while the negative electrode plate is composed of a negative electrode current collector and a negative electrode material mixture layer formed on the surface of the negative electrode current collector.

For example, the positive electrode plate of a lithium ion secondary battery as a typical non-aqueous electrolyte secondary battery is obtained by applying a slurry-like paste, which is prepared by dispersing a positive electrode active material such as lithium cobaltate, a conductor and a binder resin in a suitable dispersion solvent, on a positive electrode current collector such as an aluminum foil, and drying the slurry-like paste to form a positive electrode material mixture layer, followed by rolling.

Also, the negative electrode plate of the lithium ion secondary battery is obtained by applying a slurry-like paste, which is prepared by dispersing a negative electrode active material capable of absorbing and emitting lithium upon charging and discharging and a binder resin in a suitable dispersion solvent, on a negative electrode current collector such as a copper foil, and drying the slurry-like paste to form a negative electrode material mixture layer, followed by rolling. As the negative electrode active material, a carbon material such as non-graphitizable carbon is preferably used.

A lead as a current terminal is attached to each of the positive electrode plate and the negative electrode plate. An electrode group is formed by winding or laminating the positive electrode plate and the negative electrode plate with a separator interposed therebetween. A lithium ion secondary battery is assembled by encasing the electrode group in a battery case, injecting a non-aqueous electrolytic solution therein and sealing the battery case. As the non-aqueous electrolytic solution, a solution prepared by dissolving a lithium-based compound in the nonaqueous solvent is used.

So as to maintain performance of the battery, it is required for the binder resin contained in the negative electrode material mixture layer to be chemically stable in an electrolytic solution, to be less likely to elute in the electrolytic solution, to be free from swelling caused by absorption of the electrolytic solution and to be applicable to a negative electrode current collector in a proper thickness. In a step of producing a negative electrode plate, after a negative electrode material mixture layer paste is applied on the negative electrode current collector and dried to form a material mixture layer, a rolling step by press working using a roll press and a flat plate press is commonly performed so as to increase adhesion between a current collector and a material mixture layer and to improve density and homogeneity of the material mixture layer. After the rolling step, post-processing such as a cutting step and an assembling step is performed. In the post-processing, the binder resin is required to have flexibility and high adhesion with the current collector so as to prevent separation such as detachment or falling of the negative electrode material mixture layer from the negative electrode current collector and the occurrence of cracks.

Also, the amount of the binder resin is preferably a small amount so as to improve performances of the battery for the following reason. Namely, when a large amount of the binder resin is added, the surface of the negative electrode active material is coated with the binder resin and thus discharge characteristics deteriorate. In order to maintain sufficient adhesion to the current collector using a small amount of the binder resin, a binder resin having a low glass transition temperature and high tackiness is preferably used. However, when such a binder resin having high tackiness is used, the formed material mixture layer may adhere onto a press mold upon press working, thereby a portion of the material mixture layer separating and falling from the current collector, and thus yield rate decreases.

Some proposals on binder for improving adhesion between the material mixture layer and the current collector resin have hitherto been made.

For example, Japanese Patent No. 3,101,775 (Patent Document 1) discloses a negative electrode for a secondary battery, containing a carbon material as an active material in which a negative electrode active material is bound by a binder resin containing, as a main component, a styrene/butadiene latex which contains 40 to 95% by mass of butadiene and 75 to 100% of gel content. Since the binder resin has a low glass transition temperature ($T_g$), a material mixture paste is applied in a rubber state when applied at a room temperature and the rubber state is also maintained in a post-processing step. Since a binder resin has a high adhesive strength when it exists in a glass state at a temperature lower than the $T_g$, adhesion of a binder resin in the glass state is not sufficiently exhibited when the post-processing step is performed in the rubber state. In this case, it becomes more likely for the material mixture layer to separate or fall from the current collector. Particularly, when processing is performed at a high application speed and a high rolling speed, there is a remarkable tendency that a sufficient adhesive strength is not attained. When the adhesive strength is increased by increasing the amount of the binder resin so as to suppress separation or falling, there arises a problem that, when the surface of the negative electrode active material is coated with the binder resin, discharge characteristics deteriorate and the capacity under high temperature conditions remarkably decreases.

Also, Japanese Unexamined Patent Publication (Kokai) No. 2000-67871 (Patent Document 2) discloses a negative electrode for a non-aqueous electrolyte secondary battery, using a mixture of one or more kinds of binder resins selected from a binder resin (A) selected from styrene-butadiene copolymers in which the bound styrene content is 20% by mass or more and 70% by mass or less based on the entire styrene-butadiene copolymer, and a resin (B) selected from a styrene-butadiene copolymer and polystyrene in which the bound styrene content is 80% by mass or more and less than 100% by mass.

Patent Document 2 also discloses that, when the binder resin (A) and the binder resin (B) are used, a negative electrode active material is scarcely coated with the binder resin (B) and the negative electrode active materials are bonded by the binder resin (A) through the binder resin (B) and thus a negative electrode having a high peel strength of a material mixture layer and excellent handling properties is obtained, and that it becomes possible to improve discharge characteristics of the non-aqueous electrolyte secondary battery at low temperature. However, in the negative electrode, it is impossible to sufficiently exhibit characteristics in the rubber state of the binder resin (A) having a low $T_g$ and characteristics in the glass state of the binder resin (B) having a high $T_g$. Namely, since the adhesive strength largely depends on the binder resin (A) having a low $T_g$, a sufficient adhesive strength to the current collector cannot be obtained unless a large amount of the binder resin is used in total.

Also, Japanese Unexamined Patent Publication (Kokai) No. 2004-247184 (Patent Document 3) discloses that the temperature of a mixture of a positive electrode active material, a conductive material, a binder resin and an organic solvent during mixing and stirring is controlled to a temperature range where the binder resin dissolved in the organic solvent is not precipitated as a solid and also the temperature of a mixture of a positive electrode active material, a conductive material, a binder resin and an organic solvent during mixing and stirring is preferably controlled within a range from 30 to 60° C. in a method for producing a positive electrode material mixture paste, which comprises the steps of mixing a positive electrode active material, a conductive material, a binder resin and an organic solvent, followed by stirring. This technique aims at enhancing stability of paste viscosity so as to improve productivity of the positive electrode. Although coatability is improved by enhancing stability of paste viscosity, the effect of suppressing falling or separation of the material mixture layer from the current collector is not obtained thereby.

SUMMARY OF THE INVENTION

An object of the present invention is to provide a method for producing a negative electrode for a non-aqueous electrolyte secondary battery plate capable of forming a negative electrode material mixture layer which is less likely to separate or fall from a negative electrode current collector.

One aspect of the present invention pertains to a method for producing a negative electrode for a non-aqueous electrolyte secondary battery comprises; a paste preparing step of kneading a mixture containing a negative electrode active material, a binder resin having a glass transition temperature within a range from 20 to 40° C. and a dispersion solvent to prepare a negative electrode material mixture paste, a paste applying step of applying the negative electrode material mixture paste controlled to a temperature which is at least 10° C. higher than the glass transition temperature of the binder resin on a current collector to form a coating film, a coating film drying step of drying the coating film to form a negative electrode precursor, and a rolling step of rolling the negative electrode precursor to prepare a negative electrode having a negative electrode material mixture layer.

Objects, features, aspects and advantages of the present invention become more apparent from the following detailed description and accompanying drawings.

DETAILED DESCRIPTION OF THE INVENTION

Embodiments of the present invention will now be described.

The method for producing a negative electrode for a non-aqueous electrolyte secondary battery in accordance with one embodiment of the present invention is a method for producing a negative electrode for a non-aqueous electrolyte secondary battery comprises; a paste preparing step of kneading a mixture containing a negative electrode active, a binder resin having a glass transition temperature within a range from 20 to 40° C. and a dispersion solvent to prepare a negative electrode material mixture paste, a paste applying step of applying the negative electrode material mixture paste controlled to a temperature which is at least 10° C. higher than the glass transition temperature of the binder resin on a current collector to form a coating film, a coating film drying step of drying the coating film to form a negative electrode precursor, and a rolling step of rolling the negative electrode precursor to prepare a negative electrode having a negative electrode material mixture layer.

Figure 1:
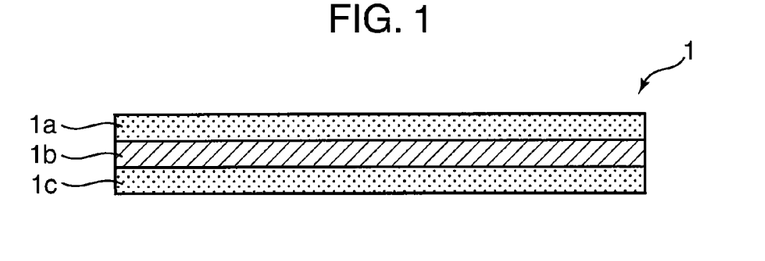
FIG. 1 is a schematic sectional view showing a constitution of a negative electrode in accordance with one embodiment of the present invention.

In FIG. 1, a schematic view showing a negative electrode 1 for a non-aqueous electrolyte secondary battery obtained by the method of the present embodiment is shown. In the negative electrode 1 for a non-aqueous electrolyte secondary battery, a negative electrode material mixture layer 1a is formed on the surface of a negative electrode current collector 1b.

The paste preparing step in the present embodiment is performed, for example, by mixing a negative electrode active material, an emulsion containing a binder resin and a thickener and kneading the mixture.

As the negative electrode active material, a substance capable of absorbing and emitting lithium upon charging and discharging of the battery can be used without any restriction. For example, carbon materials such as natural graphite, coke, carbon fiber, spherical carbon, various artificial graphites and amorphous carbon are preferably used. Also, metal, metal fiber, oxide, nitride, a tin compound, silicate and various alloy materials may be used. These negative electrode active materials may be used alone, or two or more kinds of them may be used in combination.

The emulsion containing a binder resin used in the present embodiment is an emulsion in which a binder resin having a glass transition temperature ($T_g$) within a range from 20 to 40° C. is dispersed in an emulsified state. By using a resin having a higher glass transition temperature than that of a conventional binder resin and controlling the temperature of the paste in the paste applying step to a temperature which is at least 10° C. higher than the glass transition temperature of the binder resin, the binding capacity of the binder can be increased.

A binder resin exists in a so-called glass state in a temperature range lower than the $T_g$, and exists in a so-called rubber state in a temperature range higher than the $T_g$. When a binder resin exists in the glass state, the mechanical strength is high. In contrast, when a binder resin exists in the rubber state, the binder resin exhibits viscoelasticity and thus adherence but it has a low mechanical strength.

A conventionally used binder resin has a comparatively low $T_g$. Therefore, the binder resin exists in the rubber state in a rolling step in the production step of a negative electrode and/or a post-processing step such a assembling of a battery, and is bonded due to adhesiveness in the rubber state. However, the adhesive strength due to adhesiveness is low and therefore, when an impact is applied upon such a post-processing, there arises a problem that a material mixture layer is likely to separate such as detach or fall from a current collector.

In the present embodiment, by using a binder resin having a comparatively high $T_g$ and applying a negative electrode material mixture paste in a paste applying step while controlling the temperature of the negative electrode material mixture paste to a temperature which is at least 10° C. higher than the $T_g$, a coating film can be formed in a state where the binder resin sufficiently maintains a rubber state when applied on the surface of a negative electrode current collector. After formation of the coating film, by performing the rolling step and the assembling step at a temperature which is the same as the $T_g$ of the binder resin or lower, the rubber state of the binder resin converts into the glass state with a higher adhesive force. Thus, negative electrode active materials are strongly bonded and also the adhesive strength between a negative electrode current collector and a negative electrode material mixture layer increases.

When the $T_g$ of the binder resin is lower than 20° C., since the binder resin exists in the rubber state in an environmental temperature at around room temperature in the post-processing, the binding strength and the adhesive strength decreases, and also, adhesion and cracking resistance may deteriorate by increasing the internal stress. When the $T_g$ of the binder resin is higher than 40° C., the temperature must be controlled to a temperature of 40° C. or higher so as to apply while maintaining the rubber state. In this case, it becomes difficult to form a coating film having a uniform thickness because a dispersion solvent is volatilized during application.

In the preparation of the negative electrode material mixture paste, the binder resin is preferably mixed in the form of an emulsion. As the emulsion, for example, a resin emulsion containing a styrene-butadiene-based rubber (SBR) as a resin component is preferably used in view of the fact that the $T_g$ can be controlled within a range from −30 to 60° C.

SBR is used particularly preferably in view of the fact that good charging and discharging cycle characteristics are obtained. The reason is as follows. Namely, a negative electrode active material swells or shrinks its volume by about 20% as a result of absorbing and emitting of lithium during charging and discharging. SBR follows volume variation of active material particles caused by swelling or shrinkage and electric contact between active material particles can be sufficiently maintained, and thus an increase in internal resistance of an active material mixture layer caused by repeating charging and discharging can be suppressed.

The emulsion of SBR is obtained by emulsion-polymerizing styrene, butadiene, and an optionally used monomer which is copolymerizable with styrene and butadiene.

Examples of the monomer which is copolymerizable with styrene and butadiene include ethylenically unsaturated carboxylate esters such as methyl (meth)acrylate, ethyl (meth)acrylate, butyl (meth)acrylate, (meth)acrylonitrile and hydroxyethyl (meth)acrylate; and ethylenically unsaturated carboxylic acids such as acrylic acid, methacrylic acid, itaconic acid, fumaric acid and maleic acid.

The $T_g$ of SBR can be easily adjusted by a conventionally known method which appropriately selects the content of styrene and butadiene and the copolymerizable monomer.

There are no restrictions on the particle size of the resin emulsion and the particle size is preferably from 0.01 to 0.1 μm.

With respect to the ratio of the negative electrode active material to the binder resin, the proportion of the negative electrode active material is preferably within a range from 93 to 99% by mass, and the proportion of the binder resin is preferably within a range from 1 to 7% by mass.

Examples of the thickener used in the present embodiment include carboxymethyl cellulose (CMC), methyl cellulose, hydroxymethyl cellulose, ethyl cellulose, polyvinyl alcohol, polyacrylic acid or salt thereof, oxidized starch, phosphorylated starch and casein.

The amount of the thickener is preferably from 0.5 to 1.5 parts by mass based on 100 parts by mass of the binder resin in view of the fact that a negative electrode material mixture paste having viscosity suited for application can be obtained.

The negative electrode material mixture paste may contain additives such as conductive materials or other additives. As conductive materials, for example, graphites such as natural graphite and artificial graphite; carbon blacks such as acetylene black, Ketchen black (registered trade mark), channel black, furnace black, lamp black and thermal black; and conductive fibers such as carbon fiber and metal fiber are used.

The negative electrode material mixture paste can be prepared by mixing a negative electrode active material, an emulsion of a binder resin, a thickener, and an optionally added additive such as a conductor and kneading the mixture. Alternatively, the negative electrode material mixture paste can be prepared by mixing a resin solution prepared by dissolving a binder resin in a solvent with a negative electrode active material and a thickener and kneading the mixture.

There are no restrictions on the method of kneading the mixture of a negative electrode active material, an emulsion of the binder resin, a thickener and others. The kneading method includes, for example, a kneading method using a planetary mixer. In the preparation of the material mixture paste, it is preferred to knead the mixture while maintaining the temperature of the mixture to a temperature which is at least 10° C. higher than the $T_g$ of the binder resin in view of maintaining flexibility of the binder resin.

The temperature of the mixture can be controlled by a temperature controlling device which composed of a heater equipped with a mixer or a kneader, a thermostat which senses the temperature of a mixture and controls the output of the heater according to the temperature, and a cooling muffler for removing excess heat.

There are no restrictions on the solid content of the negative electrode material mixture paste thus prepared, and the solid content is preferably from 40 to 60% by mass, and more preferably from 45 to 55% by mass.

The paste applying step of applying the negative electrode material mixture paste on a negative electrode current collector to form a coating film will now be described.

As the negative electrode current collector, for example, a lengthy porous conductive substrate or an unporous conductive substrate is used. Specific examples of the conductive substrate material of the negative electrode current collector include stainless steel, nickel and copper.

There are no restrictions on the thickness of the negative electrode current collector, and the thickness is preferably from 1 to 500 μm, and more preferably from 5 to 20 μm in view of the fact that weight saving can be performed while maintaining the strength of the negative electrode.

As the method of applying a negative electrode material mixture paste, for example, a method using a coater head such as a reverse roll, a comma bar or an air knife is used.

In the method of the present embodiment, the negative electrode material mixture paste is applied while controlling the temperature to a temperature which is at least 10° C. higher than the $T_g$ of the binder resin. By applying the negative electrode material mixture paste while controlling the temperature, a coating film is formed on the surface of a negative electrode current collector in a state where the binder resin maintains a rubber state. After formation of the coating film, by performing the rolling step and the assembling step at a temperature which is lower than the $T_g$, the strength of the negative electrode material mixture layer and the adhesive strength between the negative electrode current collector and the negative electrode material mixture layer increases.

The coating film drying step of drying a coating film formed on a negative electrode current collector will now be described.

In the method of the present embodiment, the coating film drying temperature in the coating film drying step is preferably 120° C. or higher in view of the fact that the binding strength between negative electrode active materials can be increased. In the case of drying at a temperature of lower than 120° C., when moisture remains in the formed coating film, the binder resin is likely to be hydrolyzed and thus elasticity of the binder resin may deteriorate, resulting in decreased binding strength.

A negative electrode precursor formed by the coating film drying step is subjected to a rolling step of rolling to obtain a negative electrode having a predetermined thickness by press working using a roll press or a flat plate press. By subjecting the rolling step to the negative electrode precursor, adhesion between the negative electrode current collector and the negative electrode material mixture layer increases and density and homogeneity of the negative electrode material mixture layer improve.

In the rolling step, it is preferred to roll the negative electrode precursor by a roll press or a flat plate press at a temperature lower than the glass transition temperature of the binder resin. By rolling the negative electrode precursor at the above temperature, the binder resin has high binding strength and adhesive strength, and thus separation such as detachment or falling of the negative electrode material mixture layer can be suppressed since the binder resin exists in the glass state.

The negative electrode formed by rolling is preferably subjected to a heat treatment in an atmosphere at the glass transition temperature or higher.

When the negative electrode precursor is rolled at a temperature which is lower than the glass transition temperature of the binder resin, the binder resin does not exhibit viscoelasticity in the rolling step. In this rolling step, since a high mechanical load is applied on the negative electrode active material, particles of the negative electrode active material are fractured and a bond between particles shifts, and thus the binding capacity due to the binder resin decreases.

By subjecting to a heat treatment at a temperature which is the same as the glass transition temperature or higher after the rolling step, the decreased binding capacity can be recovered since the binder resin is restored to the rubber state and viscoelasticity is exhibited. Namely, by the restoring the binder resin to the rubber state, a new binding point can be formed between negative electrode active materials.

The heat treatment temperature is preferably at a temperature which is at least 10° C. higher than the glass transition temperature, and which is lower than the temperature at which the binder resin is decomposed. The heat treatment temperature is more preferably at a temperature of 150° C. or higher, and particularly preferably of 180° C. or higher, in view of treatment efficiency.

The non-aqueous electrolyte secondary battery using the resulting negative electrode will be described with reference to FIG. 2.

Figure 2:
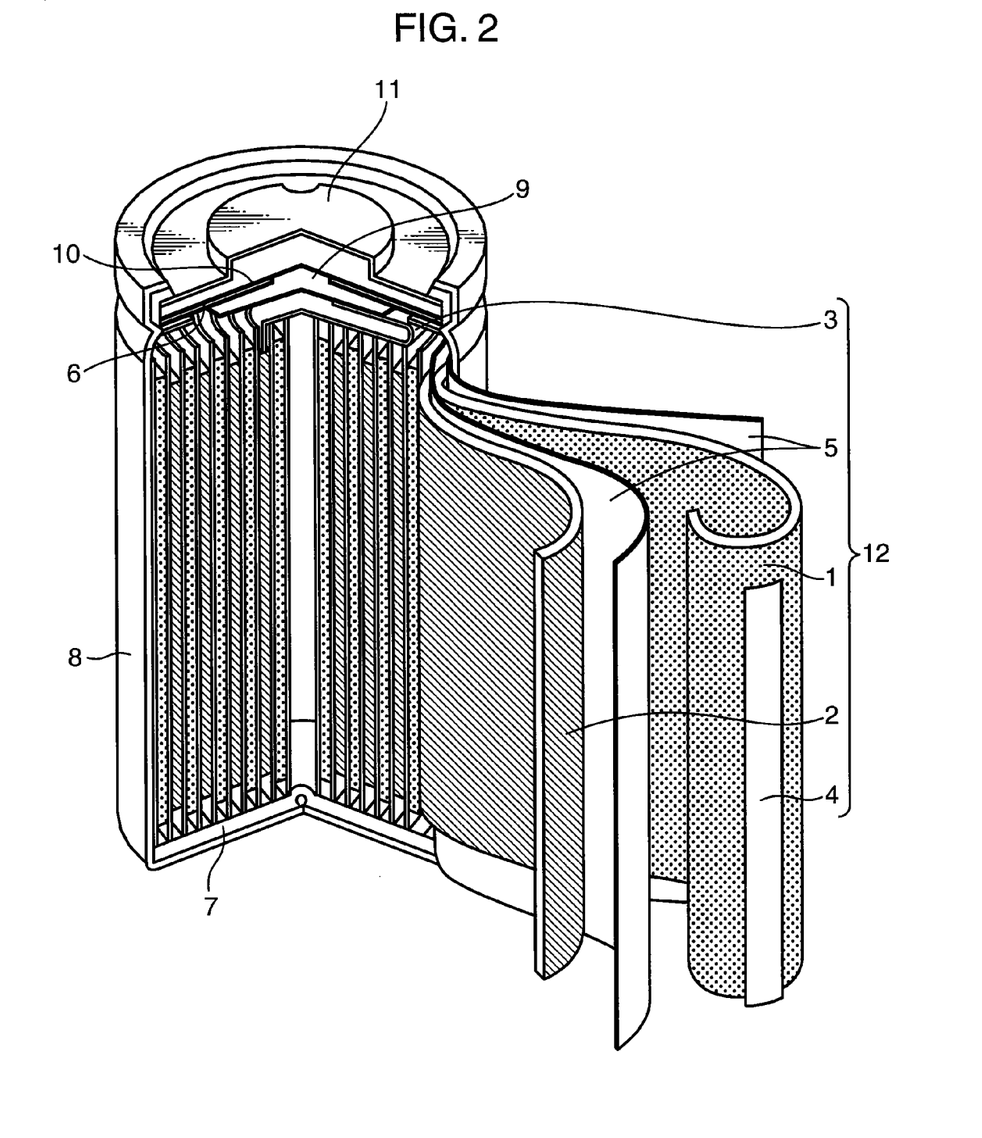
FIG. 2 is a partial sectional schematic view showing a secondary battery in accordance with one embodiment of the present invention.

FIG. 2 is a partial sectional schematic view showing one example of the non-aqueous electrolyte secondary battery. The non-aqueous electrolyte secondary battery is configured such that a battery case 8 encasing an electrode group 12 and a non-aqueous electrolytic solution (not shown) is sealed with a sealing plate 10. The electrode group 12 has a structure that a sheet-like positive electrode plate 2 with a positive electrode lead 3 and a sheet-like negative electrode plate 1 with a negative electrode lead 4 are spirally wound with a separator 5 interposed therebetween. An upper insulating plate 6 is attached to the upper portion of the electrode group 12, and a lower insulating plate 7 is attached to the lower portion of the electrode group 12. The sealing plate 10 is equipped with a gasket 9 and a positive electrode terminal 11.

The positive electrode is obtained by a method of press-bonding a positive electrode material mixture containing a positive electrode active material, a conductant material and a binder on a positive electrode current collector, followed by rolling, or a method of applying a slurry prepared by dissolving or dispersing the positive electrode material mixture in a liquid medium, followed by drying and further rolling.

It is possible to use, as the positive electrode active material, a lithium-containing complex oxide which has conventionally been used as a positive electrode active material without any restriction in the case of a lithium ion secondary battery. Specific examples of the conductive substrate material used in the positive electrode current collector include stainless steel, aluminum and titanium.

Then, the resulting positive electrode and the negative electrode are disposed in a state where the negative and positive electrodes face each other with a separator interposed therebetween, and thus an electrode group is formed. As the separator, an insulating microporous thin film having large ion permeability and a predetermined mechanical strength is used. Examples of the separator include a sheet, a nonwoven fabric and a woven fabric, which are made of an olefinic polymer of polypropylene (PP) and polyethylene (PE) having organic solvent resistance and hydrophobicity alone or in combination, or a glass fiber.

Then, the electrode group is sealed in a battery case, together with a non-aqueous electrolyte, to obtain a non-aqueous electrolyte secondary battery.

As the non-aqueous electrolyte, for example, a liquid, gel-like or solid (polymer solid electrolyte) electrolyte is used.

The liquid non-aqueous electrolyte (non-aqueous electrolytic solution) is obtained by dissolving an electrolyte (for example, a lithium salt) in a non-aqueous solvent. Also, the gel-like non-aqueous electrolyte contains a non-aqueous electrolyte, and a polymer material which holds the non-aqueous electrolyte. As the polymer material, for example, polyvinylidene fluoride, polyacrylonitrile, polyethylene oxide, polyvinyl chloride, polyacrylate and polyvinylidene fluoride hexafluoropropylene are preferably used.

There are no restrictions on the kind of non-aqueous solvent and a known non-aqueous solvent can be used as the non-aqueous solvent which dissolves the electrolyte. Specific examples thereof include a cyclic carbonate ester, a chain carbonate ester and a cyclic carboxylate ester. Examples of the cyclic carbonate ester include propylene carbonate (PC) and ethylene carbonate (EC). Examples of the chain carbonate ester include diethyl carbonate (DEC), ethylmethyl carbonate (EMC) and dimethyl carbonate (DMC). Examples of the cyclic carboxylate ester include γ-butyrolactone (GBL) and γ-valerolactone (GVL). These non-aqueous solvents may be used alone, or two or more kinds of them may be used in combination.

As the solute to be dissolved in the non-aqueous solvent, for example, LiClO$_4$, LiBF$_4$, LiPF$_6$, LiAlCl$_4$, LiSbF$_6$, LiSCN, LiCF$_3$SO$_3$, LiCF$_3$CO$_2$, LiAsF$_6$, LiB$_{10}$Cl$_{10}$, lithium lower aliphatic carboxylate, LiCl, LiBr, LiI, chloroborane lithium, borates and imide salts are used. Examples of the borates include lithium bis(1,2-benzenedioleate(2-)—O,O') borate, lithium bis(2,3-naphthalenedioleate(2-)—O,O')borate, lithium bis(2,2'-biphenyldioleate(2-)—O,O')borate and lithium bis(5-fluoro-2-oleate-1-benzenesulfonic acid—O,O') borate. Examples of the imide salts include bistrifluoromethanesulfonic acid imide lithium ((CF$_3$SO$_2$)$_2$NLi), trifluoromethanesulfonic acidnonafluorobutanesulfonic acid imide lithium (LiN(CF$_3$SO$_2$)(C$_4$F$_9$SO$_2$)) and bispentafluoroethanesulfonic acid imide lithium ((C$_2$F$_5$SO$_2$)$_2$NLi). These solutes may be used alone, or two or more kinds of them may be used in combination.

The negative electrode for a non-aqueous electrolyte secondary battery obtained by the method of the present embodiment may be applied to batteries having any shape and size, for example, a coin-shaped battery, a button-shaped battery, a sheet-shaped battery, a laminated battery, a cylindrical battery, a flat-shaped battery and a rectangular battery, and a large-sized battery used in an electric vehicle.

According to the method described above of the present embodiment, it is possible to increase the adhesive strength between the negative electrode material mixture layer and the negative electrode current collector and the binding strength between the negative electrode active materials. Therefore, the charging and discharging cycle lifetime of the non-aqueous electrolyte secondary battery is improved. Also, handling properties are improved in the step of producing an electrode and the assembling step, and thus yield of the negative electrode is improved. When an electrode group is produced by winding, separation or falling of the negative electrode material mixture layer can be suppressed, and thus productivity of the electrode group increases.

The non-aqueous electrolyte secondary battery using the negative electrode produced by the method of the present invention has a feature in a negative electrode material mixture, and there are no restrictions on other constituent elements.

According to the present invention, falling or separation of the negative electrode material mixture layer can be prevented in the production of a non-aqueous electrolyte secondary battery, particularly a lithium ion battery. Therefore, productivity of the battery is improved and also cycle lifetime characteristics are improved, and thus the battery is suited for use as a power supply of portable equipment, electric tools and hybrid cars.

EXAMPLES

The present invention will now be described by way of examples, but the present invention is not limited to the following examples.

Example 1

Production of Positive Electrode

A vinylidene polyfluoride solution was prepared by dissolving vinylidene polyfluoride as a binder resin into N-methyl pyrrolidone. The vinylidene polyfluoride solution was mixed with lithium cobaltate (LiCoO$_2$) as a positive electrode active material and an artificial graphite (KS-4 manufactured by TIMCAL Co.) as a conductor material. The resulting mixture was kneaded to form a paste of a positive electrode material mixture paste. The mixing ratio of the positive electrode material mixture was as follows: lithium cobaltate:artificial graphite:vinylidene polyfluoride=87:9:4.

On each surface of an aluminum foil measuring 15 μm in thickness, 500 mm in width and 500 m in length as a positive electrode current collector, the paste of the positive electrode material mixture was applied at a thickness of 94 μm, followed by drying, press rolling and further cutting to obtain a positive electrode. The resulting positive electrode measured 528 mm in length, 57 mm in width and 181 μm in thickness, and the material mixture layer on both surfaces measured 166 μm in thickness.

<Production of Negative Electrode>

A mixed solution of an emulsion (S2990H manufactured by JSR Corporation) of a styrene-butadiene rubber (SBR) having a glass transition temperature of 20° C. as a binder resin and an aqueous 1% solution of CMC (trade name: Cellogen EP) as a thickener was mixed with an artificial graphite (KS15 manufactured by TIMCAL Co.) as a negative electrode active material and the mixture was kneaded to form a paste of a negative electrode material mixture. The mixing ratio of the negative electrode mix was as follows: artificial graphite:CMC:SBR=98:1:1 (expressed in terms of solid content in the case of CMC and SBR).

On each surface of an electrolyte copper foil measuring 10 μm in thickness as a negative electrode current collector, the paste of the negative electrode material mixture was applied at a thickness of 84 μm. In the paste preparing step and the applying step, the temperature of the paste was controlled to a fixed temperature of 30° C. so as to maintain at the glass transition temperature of the binder resin or higher. Then, the coating film formed on the negative electrode current collector was dried at 120° C.

The resulting negative electrode precursor was press-rolled at 25° C. and then cut to obtain a negative electrode.

The negative electrode obtained after cutting was subjected to a heat treatment by vacuum drying while allowing it to stand in a vacuum dryer set at 150° C. for 12 hours.

The resulting negative electrode measured 577 mm in length, 58.5 mm in width and 162 μm in thickness, and the material mixture layer on both surfaces measured 152 μm in thickness. Also, the adhesive strength between the negative electrode material mixture layer and the negative electrode current collector measured by a cross cut-tape method described hereinafter was "8".

(Assembling of Non-Aqueous Electrolyte Secondary Battery)

A lead was connected to the positive electrode and the negative electrode, respectively.

Then, an electrode group was obtained by fixing and integrating the positive electrode, the negative electrode, and a separator so that the positive electrode and the negative electrode face each other with a 20 μm thick separator (Hipore SV718 manufactured by Asahi Kasei Chemicals Corporation) being interposed therebetween.

Meanwhile, the electrolytic solution was prepared by dissolving 1.0 mol/l of lithium phosphate hexafluoride (LiPF$_6$) in a mixed solvent of ethylene carbonate:dimethyl carbonate=1:2 (volume ratio).

Then the electrode group was spirally wounded and encased in a battery case of a so-called 18650 size measuring 18 mm in diameter and 65 mm in height, and to the battery case. Then, 5 g of an electrolytic solution was injected to the battery case and the battery case was sealed. Thus, the non-aqueous electrolytic solution lithium ion battery having a rated capacity of 2,400 mAh was assembled. The process from assembling of the cell to injection of the electrolytic solution was performed in an atmosphere at a temperature of 25° C.

Example 2

In the same manner as in Example 1, except that, in the production of the negative electrode, an emulsion (S2990G manufactured by JSR corporation) of SBR having a glass transition temperature of 28° C. as a binder resin was used and the temperature of the paste of the negative electrode material mixture was controlled to a fixed temperature of 38° C. from the paste kneading step to the applying step, a negative electrode and a positive electrode were produced and a non-aqueous electrolyte secondary battery was assembled.

Example 3

In the same manner as in Example 1, except that, in the production of the negative electrode, an emulsion (S2990P manufactured by JSR corporation) of SBR having a glass transition temperature of 40° C. as a binder resin was used and the temperature of the paste of the negative electrode material mixture was controlled to a fixed temperature of 50° C. from the paste kneading step to the applying step, a negative electrode and a positive electrode were produced and a non-aqueous electrolyte secondary battery was assembled.

Example 4

In the same manner as in Example 1, except that, in the production of the negative electrode, the negative electrode obtained after cutting was subjected to a heat treatment by vacuum drying while allowing it to stand in a vacuum dryer set at 180° C. for 12 hours, a negative electrode and a positive electrode were produced and a non-aqueous electrolyte secondary battery was assembled.

Example 5

In the same manner as in Example 2, except that, in the production of the negative electrode, the negative electrode obtained after cutting was subjected to a heat treatment by vacuum drying while allowing it to stand in a vacuum dryer set at 180° C. for 12 hours, a negative electrode and a positive electrode were produced and a non-aqueous electrolyte secondary battery was assembled.

Example 6

In the same manner as in Example 3, except that, in the production of the negative electrode, the negative electrode obtained after cutting was subjected to a heat treatment by vacuum drying while allowing it to stand in a vacuum dryer set at 180° C. for 12 hours, a negative electrode and a positive electrode were produced and a non-aqueous electrolyte secondary battery was assembled.

Example 7

In the same manner as in Example 1, except that, in the production of the negative electrode, the mixing ratio of the negative electrode material mixture was adjusted as follows: artificial graphite:CMC:SBR=98:1:0.4 and the negative electrode obtained after cutting was subjected to a heat treatment by vacuum drying while allowing it to stand in a vacuum dryer set at 180° C. for 12 hours, a negative electrode and a positive electrode were produced and a non-aqueous electrolyte secondary battery was assembled.

Example 8

In the same manner as in Example 1, except that, in the production of the negative electrode, the mixing ratio of the negative electrode material mixture was adjusted as follows: artificial graphite:CMC:SBR=98:1:0.8 and the negative electrode obtained after cutting was subjected to a heat treatment by vacuum drying while allowing it to stand in a vacuum dryer set at 180° C. for 12 hours, a negative electrode and a positive electrode were produced and a non-aqueous electrolyte secondary battery was assembled.

Example 9

In the same manner as in Example 1, except that, in the production of the negative electrode, the mixing ratio of the negative electrode material mixture was adjusted as follows: artificial graphite:CMC:SBR=98:1:2 and the negative electrode obtained after cutting was subjected to a heat treatment by vacuum drying while allowing it to stand in a vacuum dryer set at 180° C. for 12 hours, a negative electrode and a positive electrode were produced and a non-aqueous electrolyte secondary battery was assembled.

Example 10

In the same manner as in Example 1, except that, in the production of the negative electrode, the negative electrode obtained after cutting was subjected to a heat treatment by vacuum drying while allowing it to stand in a vacuum dryer set at 130° C. for 12 hours, a negative electrode and a positive electrode were produced and a non-aqueous electrolyte secondary battery was assembled.

Example 11

In the same manner as in Example 1, except that, in the production of the negative electrode, the temperature of the paste of the negative electrode material mixture was controlled to a fixed temperature of 40° C. from the paste kneading step to the applying step, a negative electrode and a positive electrode were produced and a non-aqueous electrolyte secondary battery was assembled.

Comparative Example 1

In the same manner as in Example 1, except that, in the production of the negative electrode, the temperature of the paste of the negative electrode material mixture was controlled to a fixed temperature of 20° C. from the paste kneading step to the applying step, a negative electrode and a positive electrode were produced and a non-aqueous electrolyte secondary battery was assembled.

Comparative Example 2

In the same manner as in Example 3, except that, in the production of the negative electrode, the temperature of the paste of the negative electrode material mixture was controlled to a fixed temperature of 30° C. from the paste kneading step to the applying step, a negative electrode and a positive electrode were produced and a non-aqueous electrolyte secondary battery was assembled.

Comparative Example 3

In the same manner as in Example 1, except that, in the production of the negative electrode, an emulsion (BM-400B manufactured by Zeon Corporation) of SBR having a glass transition temperature of 55° C. as a binder resin was used, a negative electrode and a positive electrode were produced and a non-aqueous electrolyte secondary battery was assembled.

Comparative Example 4

In the same manner as in Example 1, except that, in the production of the negative electrode, an emulsion (S2990B manufactured by JSR Corporation) of SBR having a glass transition temperature of −4° C. as a binder resin was used, a negative electrode and a positive electrode were produced and a non-aqueous electrolyte secondary battery was assembled.
Evaluation
(Cross Cut-Tape Method Adhesive Strength)

The adhesive strength between the negative electrode material mixture layer of the negative electrode and the negative electrode current collector obtained in the Examples and the Comparative Examples was evaluated by a cross cut-tape method.

The cross cut-tape method (X cut tape method) is a testing method for evaluating the adhesive strength of a coating film defined in JIS K 5400-1990 "8.5.3". Specifically, X-shaped cut lines, which penetrate through the coating film of a test piece to reach a groundwork surface are formed by a cutter knife. Herein, cut lines are cut lines measuring about 40 mm in size, which intersect each other at an angle of about 30° and reach the groundwork. An adhesive cellophane tape is applied so as to adjust the length of the bonded portion to about 50 mm, and then completely adhered onto the coating film by rubbing with an eraser. 1 to 2 minutes after adhering the tape, the tape was momentarily separated by grasping one end of the tape while maintaining the tape perpendicularly to the coated surface. Adhesion with the groundwork or adhesion between coating films is evaluated by the state of the coating film. The adhesive strength measured by the cross cut-tape method was evaluated according to the following criteria.

10: Separation is not found at all.
8: Separation is not found at the intersection point and slight separation is found around the x cut portion lines.
6: Separation within 1.5 mm is found at the surrounding aria of intersection point.
4: Separation within 3.0 mm is found at the surrounding aria of intersection point.
2: Separation is found in the most part of x cut portion lines bonded the tape.
0: The area of the separated portion is larger than the entire x cut portion.

(Capacity Retention after 300 Charging and Discharging Cycles)

Using each of negative electrodes obtained in the Examples and the Comparative Examples, a non-aqueous electrolytic solution lithium ion secondary battery having a rated capacity of 2,400 mAh was produced and capacity retention after 300 charging and discharging cycles was evaluated. The battery has a 18650 size measuring 18 mm in diameter and 65 mm in height. The battery was charged at a constant current of 1.2 A while controlling the voltage at 4.2 V for 3 hours, while the battery was continuously discharged at a constant current of 480 mA until the discharge voltage finally reaches 3.0 V. A rest period of 30 minutes was provided between charging and discharging. The charging and discharging cycle was performed under these conditions and retention of the discharge capacity to an initial discharge capacity after 300 cycles was determined.

The results are shown in Table 1.

TABLE 1

| | GLASS TRANSITION TEMPERATURE (° C.) | BINDER RESIN (PARTS BY MASS) | PASTE PREPARING TEMPERATURE (° C.) | APPLYING STEP TEMPERATURE (° C.) | COATING FILM DRYING TEMPERATURE (° C.) | ROLLING STEP TEMPERATURE (° C.) |
|---|---|---|---|---|---|---|
| EXAMPLE 1 | 20 | 1.0 | 30 | 30 | 120 | 25 |
| EXAMPLE 2 | 28 | 1.0 | 38 | 38 | 120 | 25 |
| EXAMPLE 3 | 40 | 1.0 | 50 | 50 | 120 | 25 |
| EXAMPLE 4 | 20 | 1.0 | 30 | 30 | 120 | 25 |
| EXAMPLE 5 | 28 | 1.0 | 38 | 38 | 120 | 25 |
| EXAMPLE 6 | 40 | 1.0 | 50 | 50 | 120 | 25 |
| EXAMPLE 7 | 20 | 0.4 | 30 | 30 | 120 | 25 |
| EXAMPLE 8 | 20 | 0.8 | 30 | 30 | 120 | 25 |
| EXAMPLE 9 | 20 | 2.0 | 30 | 30 | 120 | 25 |
| EXAMPLE 10 | 20 | 1.0 | 30 | 30 | 120 | 25 |
| EXAMPLE 11 | 20 | 1.0 | 40 | 40 | 120 | 25 |
| COMPARATIVE EXAMPLE 1 | 20 | 1.0 | 20 | 20 | 120 | 25 |
| COMPARATIVE EXAMPLE 2 | 40 | 1.0 | 30 | 30 | 120 | 25 |
| COMPARATIVE EXAMPLE 3 | 55 | 1.0 | 30 | 30 | 120 | 25 |
| COMPARATIVE EXAMPLE 4 | −4 | 1.0 | 30 | 30 | 120 | 25 |

| | HEAT TREATMENT TEMPERATURE (° C.) | TEMPERATURE OF PROCESS FROM ASSEMBLING OF CELL TO INJECTION OF ELECTROLYTIC SOLUTION (° C.) | ADHESIVE STRENGTH MEASURED BY CROSS CUT-TAPE METHOD | CAPACITY RETENTION AFTER 300 CYCLES (%) |
|---|---|---|---|---|
| EXAMPLE 1 | 150 | 25 | 8 | 91 |
| EXAMPLE 2 | 150 | 25 | 10 | 94 |
| EXAMPLE 3 | 150 | 25 | 8 | 90 |

TABLE 1-continued

| | | | | |
|---|---|---|---|---|
| EXAMPLE 4 | 180 | 25 | 10 | 93 |
| EXAMPLE 5 | 180 | 25 | 10 | 95 |
| EXAMPLE 6 | 180 | 25 | 8 | 90 |
| EXAMPLE 7 | 180 | 25 | 8 | 86 |
| EXAMPLE 8 | 180 | 25 | 10 | 88 |
| EXAMPLE 9 | 180 | 25 | 10 | 89 |
| EXAMPLE 10 | 130 | 25 | 8 | 80 |
| EXAMPLE 11 | 150 | 25 | 10 | 92 |
| COMPARATIVE EXAMPLE 1 | 150 | 25 | 6 | 79 |
| COMPARATIVE EXAMPLE 2 | 150 | 25 | 4 | 76 |
| COMPARATIVE EXAMPLE 3 | 150 | 25 | 4 | 72 |
| COMPARATIVE EXAMPLE 4 | 150 | 25 | 6 | 78 |

As shown in Table 1, the adhesive strength measured by the cross cut-tape method of all negative electrodes obtained in the Examples was 8 or more. In contrast, the adhesive strength measured by a cross cut-tape method of all negative electrodes obtained in the Comparative Examples was 6 or less. Capacity retention after 300 charging and discharging cycles of all secondary batteries obtained using the negative electrode obtained in the Examples was 80% or more.

It is found that a decrease in cycle lifetime is suppressed when the adhesive strength between the negative electrode material mixture layer and the negative electrode current collector in the negative electrode measured by a cross cut-tape method is "8" or more. The reason is considered as follows. Namely, when the adhesive strength measured by the cross cut-tape method is "8" or more, a sufficient adhesive strength can be maintained upon production and also electric contact between particles can be maintained even if active material particles cause volume variation upon charging and discharging, and thus an increase in the internal resistance of an active material material mixture layer can be suppressed.

One aspect of the present invention described above pertains to a method for producing a negative electrode for a non-aqueous electrolyte secondary battery comprises; a paste preparing step of kneading a mixture containing a negative electrode active material, a binder resin having a glass transition temperature within a range from 20 to 40° C. and a dispersion solvent to prepare a negative electrode material mixture paste, a paste applying step of applying the negative electrode material mixture paste controlled to a temperature which is at least 10° C. higher, preferably 20° C. higher than the glass transition temperature of the binder resin on a current collector to form a coating film, a coating film drying step of drying the coating film to form a negative electrode precursor, and a rolling step of rolling the negative electrode precursor to prepare a negative electrode having a negative electrode material mixture layer. With the above constitution, it is possible to form a negative electrode material mixture layer which is less likely to separate or fall from a negative electrode current collector.

The temperature of the negative electrode material mixture paste in the paste preparing step is preferably controlled to a temperature which is at least 10° C. higher than the glass transition temperature of the binder resin in view of maintaining flexibility of the binder resin.

In the above method, the coating film drying step is preferably a step of heat-treating in an atmosphere at 120° C. or higher in view of the fact that hydrolysis of the binder resin can be suppressed.

In the above method, the rolling step is preferably a step of rolling using a rolling device at a temperature which is the same as the glass transition temperature or lower in view of the fact that the binder resin can maintain higher adhesive strength and binding strength.

It is preferred that the method of the present invention further comprises a heat treating step of heat-treating the negative electrode in an atmosphere at a temperature, which is at least 10° C. higher than the glass transition temperature, specifically at a atmosphere temperature of 150° C. or higher, preferably of 180° C. or higher, after the coating film drying step. With the above constitution, a new binding point can be formed between negative electrode active materials by heat-treating the binder resin again at a temperature which is the same as the glass transition temperature or higher, thereby restoring to a rubber state and exhibiting viscoelasticity, after the rolling step.

The binder resin is preferably a styrene-butadiene-based copolymer for the following reason. Namely, an increase in internal resistance can be suppressed because it is possible to follow swelling and shrinkage of negative electrode active material particles when charging and discharging of the battery are repeated.

One aspect of the present invention pertains to a negative electrode for a non-aqueous electrolyte secondary battery plate, which is capable of being obtained by the method for producing a negative electrode for a non-aqueous electrolyte secondary battery. The non-aqueous electrolyte secondary battery formed by using such a negative electrode has a long lifetime.

In the above negative electrode for a non-aqueous electrolyte secondary battery, the negative electrode material mixture layer preferably has an adhesive strength measured by a cross cut-tape method defined in JIS K 5400 (1990) of "8" or more in view of excellent lifetime characteristics.

This application is based on Japanese Patent application serial No. 2006-319854 filed in Japan Patent Office on Nov. 28, 2006, the contents of which are hereby incorporated by reference.

Although the present invention has been fully described by way of example, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for producing a negative electrode for a non-aqueous electrolyte secondary battery comprising:
a paste preparing step of kneading a mixture containing a negative electrode active material, a binder resin having a glass transition temperature within a range from 20 to 40° C. and a dispersion solvent to prepare a negative electrode material mixture paste at a temperature at least 10° C. higher than the glass transition temperature of the binder resin, wherein the binder resin consists of one kind of a styrene-butadiene-based copolymer in a form of an emulsion containing the resin having a particle size of 0.01 to 0.1 μm, a paste applying step of applying the negative electrode material mixture paste controlled to a temperature which is at least 20° C. higher than the glass transition temperature of the binder resin on a current collector to form a coating film, a coating film drying step of drying the coating film by heat-treating in an atmosphere at 120° C. or higher to form a negative electrode precursor, a rolling step of rolling the negative electrode precursor using a rolling device at a temperature same as the glass transition temperature or lower to prepare a negative electrode having a negative electrode material mixture layer, and a heat treating step of heat-treating the negative electrode in an atmosphere at 150° C. or higher.

2. The method for producing a negative electrode for a non-aqueous electrolyte secondary battery according to claim 1, wherein the heat treating step is a step of heat-treating the negative electrode in an atmosphere at 180° C. or higher.

3. A negative electrode for a non-aqueous electrolyte secondary battery, which is capable of being obtained by the method for producing a negative electrode for a non-aqueous electrolyte secondary battery according to claim 1.

* * * * *